United States Patent
Maehara

(10) Patent No.: US 10,906,361 B2
(45) Date of Patent: Feb. 2, 2021

(54) SENSOR TRANSMITTER, WHEEL POSITION DETECTION APPARATUS, AND TIRE PRESSURE MONITORING SYSTEM PROVIDED WITH THE SAME

(71) Applicant: DENSO CORPORATION, Kariya (JP)

(72) Inventor: Hiroaki Maehara, Kariya (JP)

(73) Assignee: DENSO CORPORATION, Kariya (JP)

( * ) Notice: Subject to any disclaimer, the term of this patent is extended or adjusted under 35 U.S.C. 154(b) by 260 days.

(21) Appl. No.: 15/759,837

(22) PCT Filed: Sep. 5, 2016

(86) PCT No.: PCT/JP2016/075921
§ 371 (c)(1),
(2) Date: Mar. 14, 2018

(87) PCT Pub. No.: WO2017/047419
PCT Pub. Date: Mar. 23, 2017

(65) Prior Publication Data
US 2018/0257441 A1 Sep. 13, 2018

(30) Foreign Application Priority Data
Sep. 17, 2015 (JP) .................. 2015-184083

(51) Int. Cl.
*B60C 23/04* (2006.01)
*G01D 5/00* (2006.01)
*G01L 17/00* (2006.01)

(52) U.S. Cl.
CPC ...... *B60C 23/0416* (2013.01); *B60C 23/0489* (2013.01); *G01D 5/00* (2013.01); *G01L 17/00* (2013.01)

(58) Field of Classification Search
CPC ................. B60C 23/0416; B60C 23/0489
See application file for complete search history.

(56) References Cited

U.S. PATENT DOCUMENTS 6,633,229 B1   10/2003 Normann et al.
2006/0238323 A1   10/2006 Watabe et al.
(Continued)

FOREIGN PATENT DOCUMENTS

JP   4111305 B2   7/2008
JP   4175348 B2   11/2008
(Continued)

OTHER PUBLICATIONS

Machine translation of JP2013049400 (Year: 2013).*

*Primary Examiner* — Matthew G Marini
(74) *Attorney, Agent, or Firm* — Harness, Dickey & Pierce, P.L.C.

(57) ABSTRACT

A wheel position detection apparatus is applicable to a vehicle in which four wheels provided with tires are attached to a vehicle body, and is provided with sensor transmitters and a receiver. The sensor transmitters each include an acceleration sensor and a first control portion that detects the position of the corresponding wheel on the basis of the acceleration thereof, and creates and transmits a frame in which data indicating the result of the wheel position detection are stored. The receiver is provided in the vehicle body, and includes: a receiving portion that receives each transmitted frame by means of a receiving antenna; and a second control portion that identifies whether the sensor transmitter that has transmitted each frame is attached to the right wheels or the left wheels, from among the four wheels.

7 Claims, 7 Drawing Sheets

(56) References Cited

U.S. PATENT DOCUMENTS

2007/0008097 A1     1/2007   Mori et al.
2009/0160632 A1     6/2009   Mori et al.
2012/0319831 A1*   12/2012   Maehara ............. B60C 23/0416
                                                                           340/447

FOREIGN PATENT DOCUMENTS

| JP | 4548196 B2 | | 9/2010 |
|---|---|---|---|
| JP | 2013049400 A | * | 3/2013 |
| JP | 5447442 B2 | | 3/2014 |

* cited by examiner $A_{sens}(t)$ $C_1 t^2 + C_2 t + C_3$

| INITIAL SPEED (Vo) | 30km/h |
|---|---|
| ACCELERATION (a) | −0.2G |
| TIRE RADIUS | 31.1cm |
| RIM RADIUS | 19.1cm |
| TILT ANGLE ($\theta$ set) | 85° |
| VEHICLE WEIGHT | 1625kg |
| WHEEL BASE | 2.7m |
| HEIGHT OF GRAVITATIONAL CENTER | 55.9cm |
| DISTANCE FROM GRAVITATIONAL CENTER TO FRONT WHEEL AXLE | 1.412m |
| DISTANCE FROM GRAVITATIONAL CENTER TO REAR WHEEL AXLE | 1.288m |

SENSOR TRANSMITTER, WHEEL POSITION DETECTION APPARATUS, AND TIRE PRESSURE MONITORING SYSTEM PROVIDED WITH THE SAME

CROSS REFERENCE TO RELATED APPLICATIONS

This application is a U.S. National Phase Application under 35 U.S.C. 371 of International Application No. PCT/JP2016/075921 filed on Sep. 5, 2016 and published in Japanese as WO 2017/047419 A1 on Mar. 23, 2017. This application is based on and claims the benefit of priority from Japanese Patent Application No. 2015-184083 filed on Sep. 17, 2015. The entire disclosures of all of the above applications are incorporated herein by reference.

TECHNICAL FIELD

The present disclosure relates to a sensor transmitter and a wheel position detection apparatus that detect the position of a wheel in a vehicle and is particularly suitable applied to a tire pressure monitoring system, which detects tire air pressure.

BACKGROUND ART

A tire pressure monitoring system (hereinafter referred to as TPMS) may be of a direct type. In this type of TPMS, a sensor transmitter, which includes a sensor such as a pressure sensor, is attached directly to each wheel, on which a tire is attached. This type of system also includes an antenna and a receiver in a vehicle body. The receiver receives sensor detection signals from the sensor transmitters via the antenna, so that the tire air pressure is detected.

Such a direct type TPMS is required to have the capability to determine which wheel it is that the sensor transmitter that has transmitted the data is attached to. To this end, wheel position detection is performed to detect a wheel to which each sensor transmitter is attached in various manners, for example, as described below in (1) to (6).

(1) The wheel position detection is performed using bidirectional communication in which sensor transmitters, which have the capability to receive trigger signals, transmit data indicative of reception strength of the trigger signals to the receiver. Specifically, a trigger machine is placed in a location at differing distances from the sensor transmitters, so that the sensor transmitters measure trigger signals output by the trigger machine with differing reception strengths. The wheel position detection is performed on the basis of the differences in reception strength.

(2) In another method, the receiver is placed at a location in a vehicle body at differing distances from the sensor transmitters. In such a method, the receiver measures the signal strength of RF (radio frequency) signals transmitted by the sensor transmitters. The wheel position detection can be performed on the basis of the results of the measurement and the relationship between the distances from the sensor transmitters to the receiver and reception strength patterns measured in advance.

(3) In yet another method, the sensor transmitters are equipped with two-axis acceleration sensors (hereinafter referred to as G sensors) that can sense the acceleration of the wheels in the rotational direction and the radial direction (for example, Patent Literature 1). The detection signal phase difference between the axes of each G sensor changes depending on the rotational direction of the associated wheel. The receiver compares the phase differences to determine whether a transmitter of interest is attached to a right wheel or a left wheel, so that the wheel position detection is performed.

(4) In still another method, the wheel position detection is performed in which it is determined whether a sensor transmitter of interest is attached on a front wheel or a rear wheel on the basis of the fact that a steerable wheel travels longer than a driven wheel. The centrifugal force of a rotating tire is proportional to the wheel speed, and a value proportional to the traveling distance of the tire is generated by integrating the centrifugal force of the wheel sensed by the G sensor. The receiver receives the value and determines that the wheel is a steerable wheel if the value indicates a longer tire traveling distance and that it is a driven wheel if the value indicates a shorter distance.

(5) There is still another method in which the wheel position detection is performed by using gear information from a wheel speed sensor applied to the anti-lock braking system (hereinafter referred to as ABS) control. Specifically, when it is determined that a wheel achieves a predetermined rotational position (a rotary angle) on the basis of an acceleration sensing signal from a G sensor attached in a sensor transmitter, a frame is transmitted from the wheel side. The passage of a tooth of the gear, which is rotated in conjunction with the wheel, is detected by the wheel speed sensor. The wheel position detection is performed on the basis of the variation width of the tooth position by using the fact that the position of the tooth is substantially constant for each wheel at the timing of receiving a frame.

(6) There is also a method in which the receiver receives information on a tire air pressure from a sensor transmitter to measure a change in tire air pressure, and vehicle acceleration at the time is also measured. The wheel position detection is performed on the basis of the fact that the change in tire air pressure takes a value that corresponds to the vehicle acceleration.

PRIOR ART LITERATURE

Patent Literature

Patent Literature 1: JP 4111305 B2

SUMMARY OF INVENTION

The method described in (1) requires an additional device such as a trigger machine, thus leading to an increase in complexity of the device configuration and an increase in cost. The method described in (2) imposes a constraint on the mounting position of the receiver or the receiving antenna. With consideration given also to the vehicle conformance, mounting positions are further limited. The method described in (3) requires a special sensor, namely a two-axis G sensor. The method in (4) has difficulty in discriminating between a steerable wheel and a driven wheel if the front and rear wheels have different tire diameters, leading to possible wrong determination. The method in (5) uses information from a wheel speed sensor used in the ABS control, thus causing an increase in complexity of the specifications for communication with the wheel position detection apparatus or the tire pressure monitoring system. The method (6) has difficulty in achieving high accuracy with which the tire air pressure is detected and thus may not be able to perform accurate wheel position detection.

It is an object of the present disclosure to provide a sensor transmitter, a wheel position detection apparatus, and a tire pressure monitoring system provided with the same that enable accurate wheel position detection without requiring an additional device such as a trigger machine or a two-axis G sensor, without adding constraints on mounting positions, and without causing an increase in complexity of the communication specifications.

According to one aspect of the present disclosure, a wheel position detection apparatus that is applied to a vehicle including a vehicle body and four wheels attached to the vehicle body, each of the four wheels being equipped with a tire, the wheel position detection apparatus includes a sensor transmitter and a receiver. The sensor transmitter is attached to each of the four wheels, and the sensor transmitter includes an acceleration sensor that detects acceleration in a detecting direction that is shifted circumferentially by a predetermined angle with respect to a radial direction of a corresponding one of the four wheels, and a first control portion that performs wheel position detection based on the acceleration detected by the acceleration sensor and generates and transmits a frame storing data indicative of a result of the wheel position detection. The receiver is provided in the vehicle body, and the receiver includes a receiving portion that receives the frame transmitted by each of the sensor transmitters via a receiving antenna, and a second control portion that determines whether each of the sensor transmitters that has transmitted the frame is attached to one of right wheels or left wheels of the four wheels on a basis of the data indicative of the result of the wheel position detection obtained from the frame received. The first control portion calculates a tilt angle based on the acceleration detected by the acceleration sensor, the tilt angle corresponding to the predetermined angle by which the acceleration sensor is shifted circumferentially with respect to the radial direction, and the first control portion estimates whether the sensor transmitter including the first control portion is attached to one of the right wheels or the left wheels.

In another aspect of the present disclosure, a sensor transmitter applied to a wheel position detection apparatus is provided.

In another aspect of the present disclosure, a tire pressure monitoring system that includes a wheel position detection apparatus is provided. The sensor transmitter further includes a sensing portion outputting a detection signal corresponding to an air pressure of the tire attached to a corresponding one of the four wheels, stores, in a frame, information on tire air pressure resulting from signal processing performed by the first control portion on the detection signal from the sensing portion, and transmits the frame to the receiver. The second control portion in the receiver detects an air pressure of the tire attached to each of the four wheels from the information on the tire air pressure.

In this manner, each of the sensor transmitters calculates a tilt angle and estimates whether it is attached to a right wheel or a left wheel on the basis of the tilt angle. Such a wheel position detection method requires no additional device such as a trigger machine and thus it may be possible to prevent an increase in complexity of the device configuration and an increase in cost. Additionally, the mounting position of the receiver or the receiving antenna is subject to reduced constraint. Additionally, a special sensor, namely a two-axis G sensor, is not required. Furthermore, a steerable wheel and a driven wheel can be discriminated. Moreover, since information from a wheel speed sensor applied to the ABS control is not used, no increase in complexity of the communication specifications is caused. Also, it may be possible to perform accurate wheel position detection without requiring accuracy with which the tire air pressure is detected.

BRIEF DESCRIPTION OF DRAWINGS

The above and other aspects, features and advantages of the present disclosure will become more apparent from the following detailed description made with reference to the accompanying drawings. In the drawings.

DESCRIPTION OF EMBODIMENTS

Figure 1:
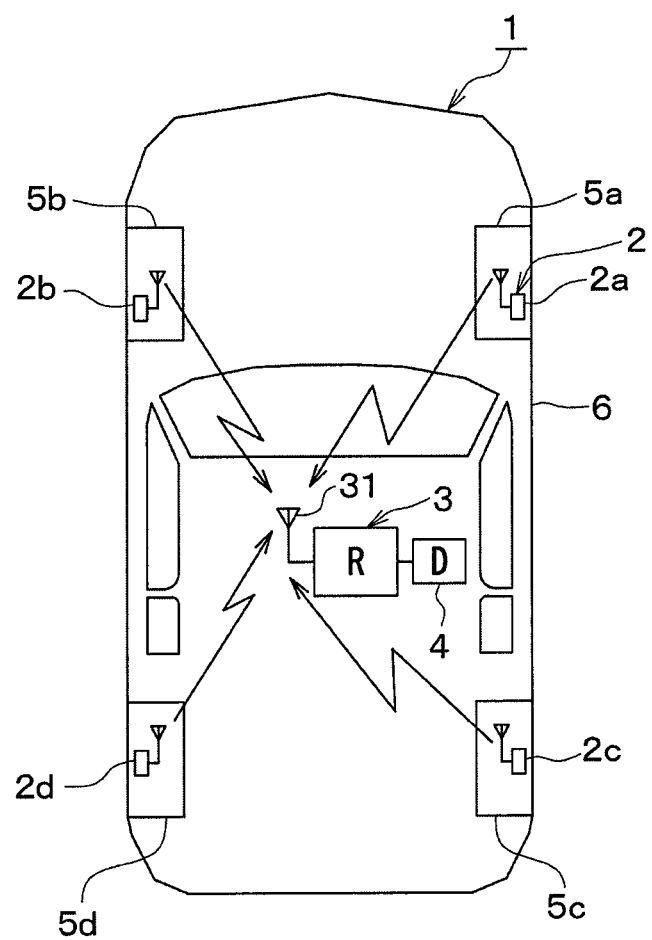
FIG. 1 is a diagram of an overall configuration of a tire pressure monitoring system according to a first embodiment of the present disclosure, the tire pressure monitoring system using a wheel position detection apparatus in the first embodiment.

Some embodiments of the present disclosure will now be described with reference to the drawings. In the following embodiments, identical or similar components are designated with identical symbols.

First Embodiment

A first embodiment of the present disclosure will now be described. While a tire pressure monitoring system, illustrated in FIG. 1, having the function of a wheel position detection apparatus is described in the present embodiment, the present embodiment may include the configuration of the wheel position detection apparatus only. An up and down direction of the page in FIG. 1 agrees with a longitudinal direction of a vehicle 1; a right and left direction of the page agrees with a lateral direction of the vehicle 1. The tire pressure monitoring system in the present embodiment will be described with reference to the drawing.

As described in FIG. 1, the tire pressure monitoring system is attached in the vehicle 1 and includes a sensor transmitter 2, a receiver 3, and an indicator 4.

As described in FIG. 1, the sensor transmitter 2 is to be attached to each of wheels 5a to 5d in the vehicle 1. In the present embodiment, sensor transmitters 2a to 2d are attached to the four wheels 5a to 5d, respectively. Each of the sensor transmitters 2a to 2d detects an air pressure in a tire attached to the corresponding one of the wheels 5a to 5d, stores tire air pressure information indicative of the result of the detection in a frame, and transmits the frame using RF. The receiver 3 is attached in a vehicle body 6 of the vehicle 1. The receiver 3 receives using RF the frames from the sensor transmitters 2a to 2d and performs various types of processing and calculation on the basis of the detection signals stored in the frames so as to perform wheel position detection and tire air pressure detection. The configurations of the sensor transmitters 2a to 2d and the receiver 3 will now be described with reference to FIG. 2A and FIG. 2B.

Figure 2A:
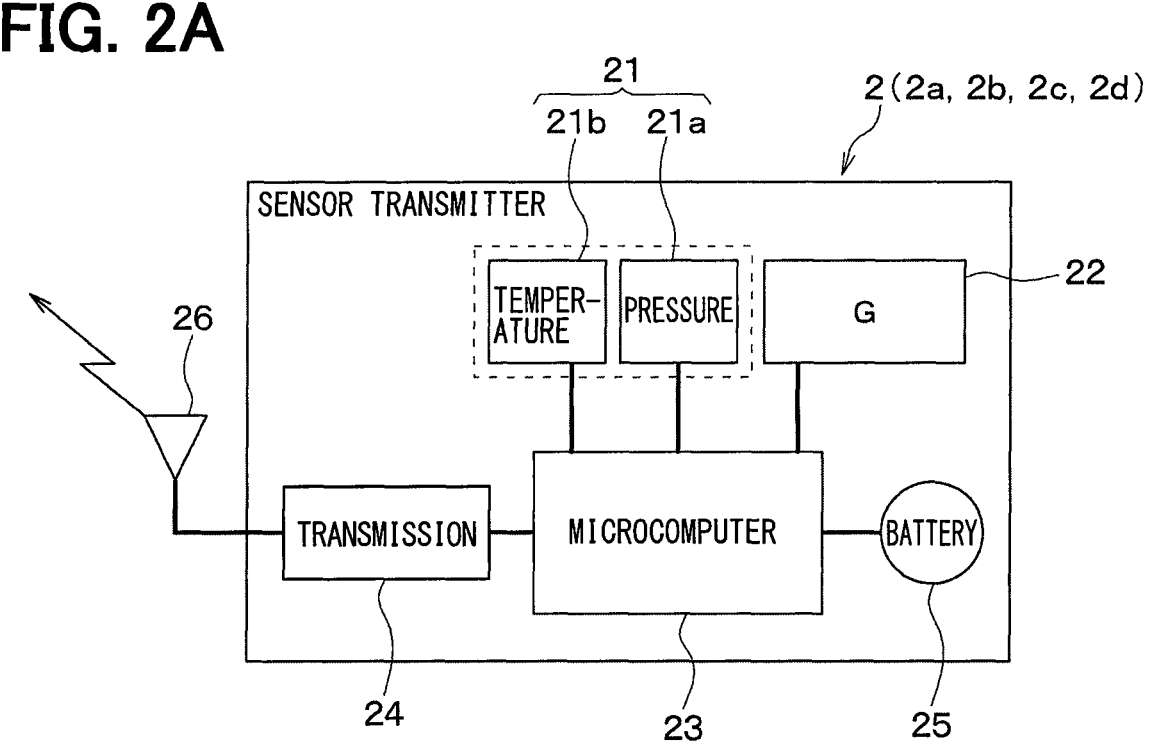
FIG. 2A is a diagram of a block configuration of a transmitter.
Figure 2B:
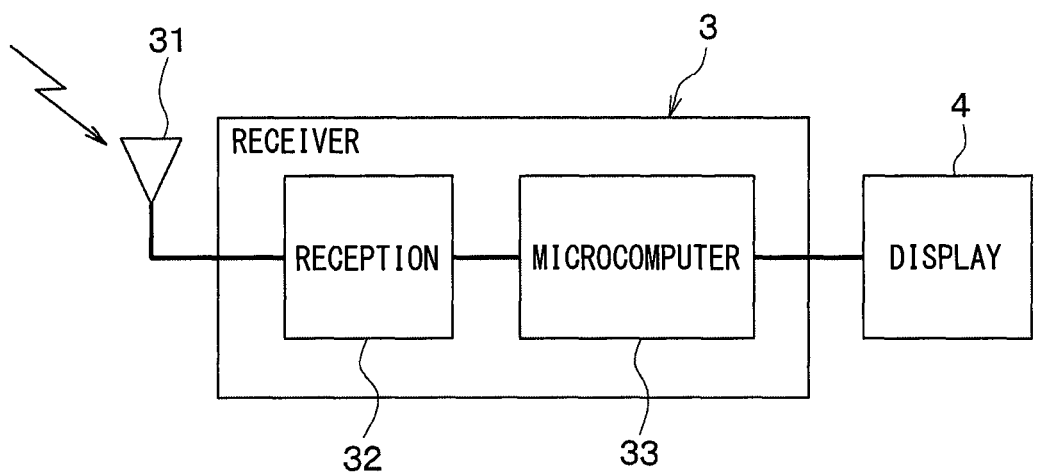
FIG. 2B is a diagram of a block configuration of a receiver.

As illustrated in FIG. 2A, each sensor transmitter 2 (2a to 2d) includes a sensing portion 21, a G sensor (an acceleration sensor) 22, a microcomputer 23, a transmission portion 24, a battery 25, and a transmission antenna 26. These components are operated on power from the battery 25.

The sensing portion 21 includes, for example, a diaphragm-type pressure sensor 21a and a temperature sensor 21b and outputs a detection signal corresponding to a tire air pressure and a detection signal corresponding to temperature. The G sensor 22 detects acceleration in one direction. In the present embodiment, the mounting angle of the G sensor 22 is adjusted in such a manner that the G sensor 22 detects acceleration in a direction shifted circumferentially by a predetermined angle with respect to a radial direction of a corresponding one of the wheels 5a to 5d (i.e., a normal direction with respect to the circumferential direction). This will be described later.

The microcomputer 23 includes a controller that corresponds to a first control portion and performs a predetermined processing including wheel position detection processing and tire air pressure detection processing in accordance with a program stored in a memory within the controller. The memory in the controller stores individual ID information including identification information unique to each of the sensor transmitters 2a to 2d for their identification and identification information unique to the vehicle for its identification. The memory in the controller also stores data applied to the wheel position detection such as, for example, the rim diameter of the wheel to which each sensor transmitter 2 is attached. The rim diameter may be stored in the memory when each sensor transmitter 2 is manufactured. Alternatively, the rim diameter may be written using a communication device at an car repair shop when each sensor transmitter 2 is mounted to each of the wheels 5a to 5d. If each sensor transmitter 2 and the receiver 3 are configured to allow for bidirectional communication, the rim diameter may be stored in the memory in the controller via the receiver 3 by, for example, a user operating on the indicator 4.

The microcomputer 23 receives a detection signal relating to a tire air pressure from the sensing portion 21, processes and, if necessary, manipulates the signal, and stores information on the tire air pressure in a frame together with the ID information of a corresponding one of the sensor transmitters 2a to 2d. The microcomputer 23 also determines that the vehicle is traveling if, for example, detected acceleration exceeds a predetermined threshold value and, after the determination, performs acceleration sampling with a short period. When the microcomputer 23 determines that the speed of the vehicle 1 (hereinafter referred to as vehicle speed) is constant on the basis of the detected acceleration, the microcomputer 23 calculates the mounting angle of the G sensor 22. Here, after the determination that the vehicle is traveling, it may be preferable to wait until the elapse of a certain time before starting the acceleration sampling with the short period, since the acceleration sampling can be performed under a stabilized vehicle speed. Having calculated the mounting angle of the G sensor 22, the microcomputer 23 estimates which wheel it is that the corresponding sensor transmitter 2 is attached to on the basis of the actual acceleration detected by the G sensor 22. The estimation may be preferably performed during deceleration. The acceleration sampling with a short period produces a significant acceleration change during deceleration and, thus, more accurate wheel position detection is enabled. Here, the microcomputer 23 estimates whether the corresponding sensor transmitter 2 is attached to one of the right wheels 5a and 5c or the left wheels 5b and 5d. The microcomputer 23 stores data indicative of, among others, the result of the estimation whether the corresponding sensor transmitter 2 is attached to one of the right wheels 5a and 5c or the left wheels 5b and 5d and a value obtained during the estimation in a frame that stores the data on the tire air pressure. The estimation of the wheel position performed by the microcomputer 23 will be described in detail later.

Having created the frame, the microcomputer 23 transmits the frame from the transmission antenna 26 via the transmission portion 24 to the receiver 3. The processing to transmit the frame to the receiver 3 is also performed in accordance with the program described above. For example, the frame transmission is reiterated with a predetermined transmission period.

The transmission portion 24 serves the function of an output portion that transmits a frame, which is transmitted by the microcomputer 23, to the receiver 3 via the transmission antenna 26. Electric waves applied to the transmission are, for example, those in an RF band.

The battery 25 supplies power to the microcomputer 23 or the like. The battery 25 supplies power, so that the sensing portion 21 collects data on a tire air pressure, the G sensor 22 detects acceleration, and the microcomputer 23 performs various types of calculation.

The sensor transmitters 2a to 2d, which are configured in such a manner, are attached to, for example, air valves of the wheels 5a to 5d, respectively, such that the sensing portions 21 are exposed towards inside of the tires. That is, the sensor transmitters 2a to 2d are attached to the wheels 5a to 5d, respectively, in a location away from the center of rotation of the wheels by a distance that corresponds to the rim diameter (specifically, by a distance of half the rim diameter). In this manner, each of the sensor transmitters 2a to 2d is enabled to detect a corresponding tire air pressure and transmit a frame at a predetermined transmission timing via the transmission antenna 26 provided in each of the sensor transmitters 2a to 2d so as to transmit a signal relating to the tire air pressure to the receiver 3 regularly.

The receiver 3 includes a receiving antenna 31, a receiving portion 32, and a microcomputer 33.

The receiving antenna 31 is one antenna for common use and collectively receives a frame transmitted by each sensor transmitter 2. The receiving antenna 31 is fixed on the vehicle body 6.

The receiving portion 32 serves the function of an input portion that receives a frame, when the frame is transmitted by each sensor transmitter 2 and received by the receiving antenna 31, and transmits it to the microcomputer 33.

The microcomputer 33 includes a CPU, a ROM, a RAM, and an I/O and performs predetermined processing in accordance with a program stored in a memory like the ROM. The microcomputer 33 includes a controller that corresponds to a second control portion. The microcomputer 33 performs the wheel position detection, which is to determine which one of the sensor transmitters 2a to 2d is attached to which one of the wheels 5a to 5d, by performing wheel position detection processing in accordance with a program stored in a memory within the microcomputer 33 using a frame transmitted by each of the sensor transmitters 2a to 2d. That is, the microcomputer 33 reads, from a frame transmitted by each of the sensor transmitters 2a to 2d, the data indicative of, among others, the result of the estimation whether each sensor transmitter 2 is attached to one of the right wheels 5a and 5c or the left wheels 5b and 5d and a value obtained during the estimation. The microcomputer 33 then determines whether each sensor transmitter 2 is attached to one of the right wheels or the left wheels on the basis of the data indicative of the result of the estimation and further determines whether each sensor transmitter 2 is attached to the front wheel or the rear wheel on the basis of data indicative of, among others, the value obtained during the estimation. The microcomputer 33 then associates the ID information of the sensor transmitters 2a to 2d with the positions of the wheels 5a to 5d that the sensor transmitters 2a to 2d are attached to on the basis of the result of the determination and stores the association.

Subsequently, the microcomputer 33 performs the tire air pressure detection on each of the wheels 5a to 5d by determining, when receiving a frame transmitted by each of the sensor transmitters 2a to 2d, which one of the sensor transmitters 2a to 2d has transmitted the frame on the basis of the ID information and the data on the tire air pressure detection stored in the frame.

The indicator 4 is located in a place visible to a driver as illustrated in FIG. 1 and configured by, for example, a warning lamp provided in an instrument panel in the vehicle 1. When, for example, receiving a signal indicative of a drop in tire air pressure from the microcomputer 33 of the receiver 3, the indicator 4 provides indication to that effect to notify the driver of the drop in tire air pressure.

Figure 3:
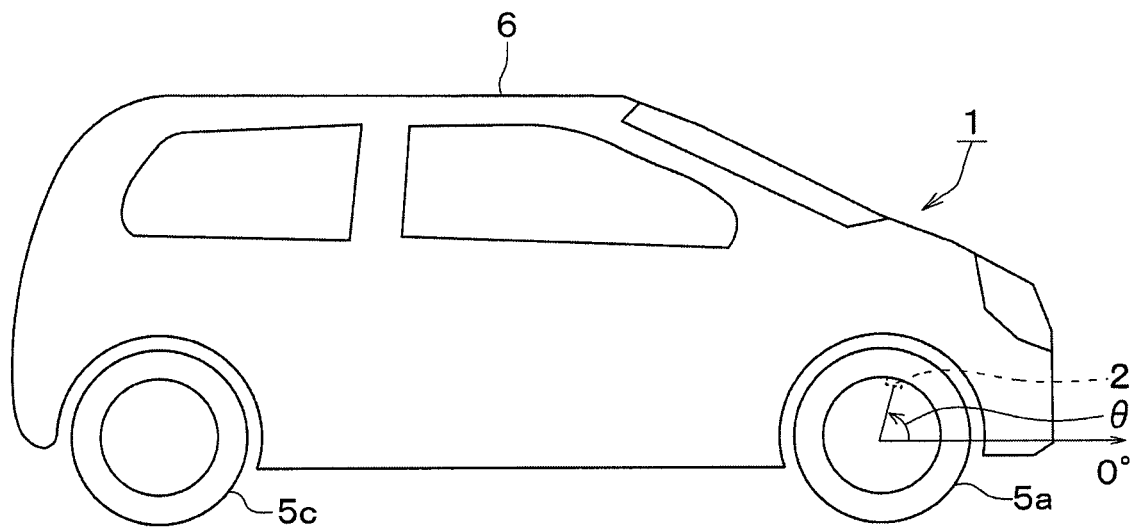
FIG. 3 is a diagram of a presence angle θ at which a G sensor, which is included in the sensor transmitter, is located about an axle at a certain point in time, as observed from a right side surface of a vehicle.
Figure 4:
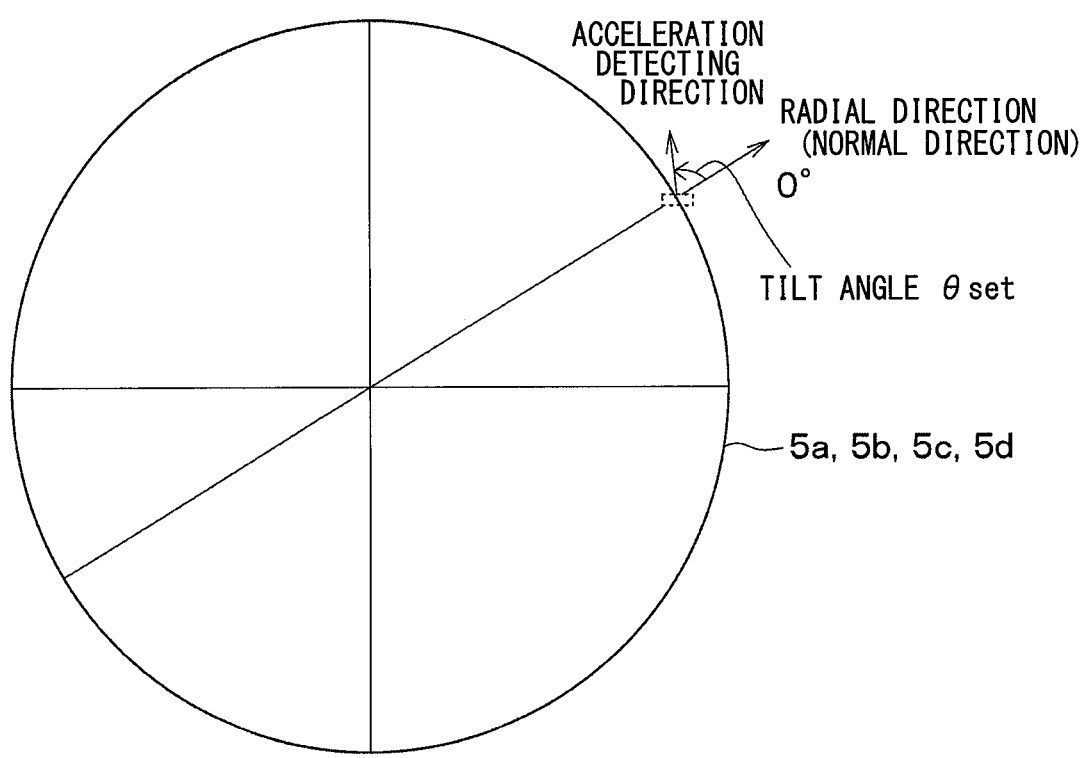
FIG. 4 is a diagram describing a tilt angle $\theta_{set}$ at which the G sensor is attached with respect to each wheel as observed from outside the vehicle.

The wheel position detection using the G sensor 22 included in each sensor transmitter 2 will now be described with reference to FIG. 3 and FIG. 4.

The G sensor 22, which is attached to each sensor transmitter 2, and each sensor transmitter 2 are attached to each of the wheels 5a to 5d. As illustrated in FIG. 3, a positive mounting angle θ of the G sensor 22 about an axle is formed from 0°, which is toward the front of the vehicle 1, counterclockwise with respect to the center of each of the wheels 5a to 5d when observed from a right side surface of the vehicle 1 for not only the right wheels 5a and 5c but also the left wheels 5b and 5d in the description below. As illustrated in FIG. 4, a positive tilt angle $θ_{set}$ at which the G sensor 22 is attached with respect to each of the wheels 5a to 5d is formed by a detecting direction of the G sensor 22 from 0°, which is in the radial direction of each of the wheels 5a to 5d, counterclockwise when observed from outside the vehicle 1 for any of the wheels 5a to 5d.

In the present embodiment, the G sensor 22 is attached to each of the wheels 5a to 5d in such a manner that the detecting direction of the G sensor 22 forms a predetermined tilt angle $θ_{set}$ with respect to the radial direction, instead of the detecting direction being parallel with the radial direction of each of the wheels 5a to 5d. With the G sensor attached in this manner and the tilt angle $θ_{set}$ known by estimation, each sensor transmitter 2 estimates whether each sensor transmitter 2 itself is attached to one of the right wheels 5a and 5c or the left wheels 5b and 5d. The estimation whether each sensor transmitter 2 is attached to one of the right wheels 5a and 5c or the left wheels 5b and 5d is performed by comparing a calculation quadratic function where acceleration obtained by calculation is approximated in a quadratic function to a measurement quadratic function where an acceleration measurement value is approximated in a quadratic function. The details will be described hereinafter. The calculation quadratic function is a quadratic function that approximates calculated acceleration deemed to be detected when the G sensor 22 is attached at the tilt angle $θ_{set}$. The measurement quadratic function is a quadratic function that approximates acceleration actually detected by the G sensor 22.

Each sensor transmitter 2 determines whether the sensor transmitter 2 itself is attached to one of the right wheels or the left wheels, and then, the receiver 3 determines whether each sensor transmitter 2 is attached to the front wheel or the rear wheel. Specifically, the receiver 3 uses a difference in tire radius, such as increase/decrease in an effective tire radius due to load movement during acceleration/deceleration of the wheels 5a to 5d, to determine whether each sensor transmitter 2 is attached to one of the front wheels 5a and 5b or the rear wheels 5c and 5d. The wheel position detection is performed in this manner. The wheel position detection will now be described in detail.

First, the microcomputer 23 estimates whether the corresponding sensor transmitter 2 is attached to one of the right wheels or the left wheels. As described above, this estimation is performed on the basis of the estimation of the tilt angle $θ_{set}$, the calculation of the calculation quadratic function, the calculation of the measurement quadratic function, and the like.

The estimation of the tilt angle $θ_{set}$ and the calculation of the calculation quadratic function are performed in the following methods.

The vehicle speed v(t) is expressed by an expression 1, where an initial vehicle speed at the timing when it is desired to perform the wheel position detection is $v_0$, the acceleration of the vehicle 1 at that time is a, and the time is t. A traveling distance L(t) of the vehicle 1 is expressed by an expression 2.

$$v(t)=v_0+at \quad \text{(Expression 1)}$$

$$L(t)=v_0 t+½at^2 \quad \text{(Expression 2)}$$

The presence angle θ at which the G sensor 22, which is attached to each of the wheels 5a to 5d, is located about the axle at this timing, i.e., the current location of the G sensor 22, satisfies the following expressions 3-1 to 3-4 described in a circular arc method. In the following description, a subscript "front" refers to a front wheel, "rear" refers to a rear wheel, "right" refers to a right wheel, and "left" refers to a left wheel. The presence angle θ at which the G sensor 22 is located about the axle when t=0, i.e., at the start of the wheel position detection is represented by $θ_0$. The effective tire radius on each of the wheels 5a to 5d is represented by $r_w$.

(Expression 3)

$$\theta_{front\_right}(t) = \theta_{0\_front\_right} - \frac{L(t)}{r_{w\_front}} \quad (3\text{-}1)$$

$$\theta_{front\_left}(t) = \theta_{0\_front\_left} - \frac{L(t)}{r_{w\_left}} \quad (3\text{-}2)$$

$$\theta_{rear\_right}(t) = \theta_{0\_rear\_right} - \frac{L(t)}{r_{w\_rear}} \quad (3\text{-}3)$$

$$\theta_{rear\_left}(t) = \theta_{0\_rear\_left} - \frac{L(t)}{r_{w\_rear}} \quad (3\text{-}4)$$

A basic expression for a measurement value $a_{sens}$ of the G sensor 22 can be expressed using the tilt angle $\theta_{set}$ in each of the wheels 5a to 5d, where $r_r$ represents the rim diameter of a tire on each of the wheels 5a to 5d.

(Expression 4)

$$a_{sens\_front\_right}(t) = -a\cos\{\theta_{front\_right}(t) + \theta_{set\_front\_right}\} - \quad (4\text{-}1)$$
$$g\sin\{\theta_{front\_right}(t) + \theta_{set\_front\_right}\} + $$
$$\frac{a \cdot r_r}{r_{w\_front}}\sin(\theta_{wt\_front\_right}) + \frac{r_r}{r_{w\_front}^2}\{v(t)\}^2\cos(\theta_{wt\_front\_right})$$

$$a_{sens\_front\_left}(t) = -a\cos\{\theta_{front\_left}(t) + \theta_{set\_front\_left}\} - \quad (4\text{-}2)$$
$$g\sin\{\theta_{front\_left}(t) + \theta_{set\_front\_left}\} - $$
$$\frac{a \cdot r_r}{r_{w\_front}}\sin(\theta_{wt\_front\_left}) + \frac{r_r}{r_{w\_front}^2}\{v(t)\}^2\cos(\theta_{wt\_front\_left})$$

$$a_{sens\_rear\_right}(t) = -a\cos\{\theta_{rear\_right}(t) + \theta_{set\_rear\_right}\} - \quad (4\text{-}3)$$
$$g\sin\{\theta_{rear\_right}(t) + \theta_{set\_rear\_right}\} + $$
$$\frac{a \cdot r_r}{r_{w\_rear}}\sin(\theta_{wt\_rear\_right}) + \frac{r_r}{r_{w\_rear}^2}\{v(t)\}^2\cos(\theta_{wt\_rear\_right})$$

$$a_{sens\_rear\_left}(t) = -a\cos\{\theta_{rear\_left}(t) + \theta_{set\_rear\_left}\} - \quad (4\text{-}4)$$
$$g\sin\{\theta_{rear\_left}(t) + \theta_{set\_rear\_left}\} - $$
$$\frac{a \cdot r_r}{r_{w\_rear}}\sin(\theta_{wt\_rear\_left}) + \frac{r_r}{r_{w\_rear}^2}\{v(t)\}^2\cos(\theta_{wt\_rear\_left})$$

Here, the tilt angle $\theta_{set}$ of the G sensor 22 with respect to each of the wheels 5a to 5d is estimated on the basis of the expressions 4-1 to 4-4. The estimation of the tilt angle $\theta_{set}$ is performed when the acceleration of the vehicle 1 is zero (i.e., a=0). The acceleration of the vehicle 1 being zero is detected on the basis of a gravity component of the acceleration detected by the G sensor 22. The gravity component of the acceleration appears as an amplitude waveform in every wheel rotation. When there is no change in the amplitude waveform, i.e., when the time interval between relative maximum values of the amplitude waveform is constant or when the time interval between relative minimum values is constant, it is detected that the acceleration of the vehicle 1 is zero.

For example, by assuming that the acceleration of the vehicle 1 at the right front wheel 5a is zero and substituting zero for the acceleration a in the expression 4-1, an expression 5 is derived.

(Expression 5)

$$a_{sens\_front\_right}(t) = -g\sin\{\theta_{front\_right}(t) + \theta_{ste\_front\_right}\} + $$
$$\frac{r_r}{r_{w\_front}^2}\{v(t)\}^2\cos(\theta_{set\_front\_right})$$

Additionally, when the acceleration a=0, the vehicle speed v(t) is constant; thus, providing v(t)=v derives an expression 6 from the expression 5.

(Expression 6)

$$a_{sens\_front\_right}(t) = $$
$$-g\sin\{\theta_{front\_right}(t) + \theta_{ste\_front\_right}\} + \frac{r_r}{r_{w\_front}^2}v^2\cos(\theta_{set\_front\_right})$$

From the expression 6, an average $A_{avg}$ of the relative maximum value and the relative minimum value of $a_{sens\_front\_right}(t)$ is expressed as in an expression 7.

(Expression 7)

$$A_{avg} = \frac{r_r}{r_{w\_front}^2}v^2\cos(\theta_{set\_front\_right})$$

Here, with the time t being $t_M$ when $a_{sens\_front\_right}(t)$ in the expression 6 achieves a relative maximum, in the time taken until it then achieves a relative minimum, an expression 8 is satisfied with a period of rotation being $T_{front\_right}$. That is, the angle $\theta_{front\_right}(t_M)+\theta_{set\_front\_right}$ that achieves a relative maximum value takes, when advanced by a half period $\pi$ in terms of angle, the same value as an angle $\theta_{front\_right}(t_M+T_{front\_right}/2)+\theta_{set\_front\_right}$ after the elapse of a half period of a tire rotation from $t_M$. Hence, the equation in the expression 8 is satisfied. From the expression 8, $T_{front\_right}$ is expressed as in an expression 9.

(Expression 8)

$$\theta_{front\_right}(t_M) + \theta_{ste\_front\_right} - \pi = $$
$$\theta_{front\_right}\left(t_M + \frac{T_{front\_right}}{2}\right) + \theta_{set\_front\_right}$$

(Expression 9)

$$T_{front\_right} = \frac{2\pi r_{w\_front}}{v}$$

The average $A_{avg}$ of the relative maximum value and the relative minimum value of $a_{sens\_front\_right}(t)$, that is, a median value of $a_{sens\_front\_right}(t)$, can be expressed as in an expression 10 with the centrifugal force $r_r(2\pi/t_{front\_right})$ and the tilt angle $\theta_{set\_front\_right}$ of the G sensor 22. Thus, the tilt angle $\theta_{set\_front\_right}$ can be derived as in an expression 11.

(Expression 10)

$$A_{avg} = r_r\left(\frac{2\pi}{T_{front\_right}}\right)^2\cos(\theta_{set\_front\_right})$$

(Expression 11)

$$\theta_{set\_front\_right} = \cos^{-1}\left\{\frac{A_{avg}}{r_r}\left(\frac{T_{front\_right}}{2\pi}\right)^2\right\}$$

While the right front wheel 5a has been described as an example, the tilt angles $\theta_{set\_front\_left}$, $\theta_{set\_rear\_right}$, $\theta_{set\_rear\_left}$ can be derived in a similar manner for the other wheels 5b to 5d. That is, the tilt angle $\theta_{set}$ can be estimated by calculation for all the G sensors 22.

Furthermore, expressing, as an acceleration $A_{sens}(t)$, a value resulting from removal of a periodic function relating to the time t from the acceleration $a_{sens}(t)$ in the basic expression for the measurement value $a_{sens}$ of the G sensor 22 indicated in each of the expressions 4-1 to 4-4 provides expressions 12-1 to 12-4.

(Expression 12)

$$A_{sens\_front\_right}(t) = +\frac{a \cdot r_r}{r_{w\_front}}\sin(\theta_{set\_front\_right}) + \frac{r_r}{r_{w\_front}^2}\{v(t)\}^2 \cos(\theta_{set\_front\_right}) \quad (12\text{-}1)$$

$$A_{sens\_front\_left}(t) = \qquad\qquad\qquad\qquad\qquad\qquad (12\text{-}2)$$
$$+\frac{a \cdot r_r}{r_{w\_front}}\sin(\theta_{set\_front\_left}) + \frac{r_r}{r_{w\_front}^2}\{v(t)\}^2 \cos(\theta_{set\_front\_left})$$

$$A_{sens\_rear\_right}(t) = \qquad\qquad\qquad\qquad\qquad\qquad (12\text{-}3)$$
$$+\frac{a \cdot r_r}{r_{w\_rear}}\sin(\theta_{set\_rear\_right}) + \frac{r_r}{r_{w\_rear}^2}\{v(t)\}^2 \cos(\theta_{set\_rear\_right})$$

$$A_{sens\_rear\_left}(t) = \qquad\qquad\qquad\qquad\qquad\qquad (12\text{-}4)$$
$$+\frac{a \cdot r_r}{r_{w\_rear}}\sin(\theta_{set\_rear\_left}) + \frac{r_r}{r_{w\_rear}^2}\{v(t)\}^2 \cos(\theta_{set\_rear\_left})$$

By rearranging the expressions 12-1 to 12-4 with respect to t with the acceleration a of the vehicle 1 being constant, expressions 13-1 to 13-4 can be derived as quadratic functions of t.

(Expression 13)

$$A_{sens\_front\_right}(t) = \left\{\frac{r_r a^2}{r_{w\_front}^2}\cos(\theta_{set\_front\_right})\right\}t^2 + \qquad (13\text{-}1)$$
$$\left\{\frac{2r_r a v_0}{r_{w\_front}^2}\cos(\theta_{set\_front\_right})\right\}t +$$
$$\frac{a r_r}{r_{w\_front}}\sin(\theta_{set\_front\_right}) + \frac{r_r v_0^2}{r_{w\_front}^2}\cos(\theta_{set\_front\_right})$$

$$A_{sens\_front\_left}(t) = \left\{\frac{r_r a^2}{r_{w\_front}^2}\cos(\theta_{set\_front\_left})\right\}t^2 + \qquad (13\text{-}2)$$
$$\left\{\frac{2r_r a v_0}{r_{w\_front}^2}\cos(\theta_{set\_front\_left})\right\}t -$$
$$\frac{a r_r}{r_{w\_front}}\sin(\theta_{set\_front\_left}) + \frac{r_r v_0^2}{r_{w\_front}^2}\cos(\theta_{set\_front\_left})$$

$$A_{sens\_rear\_right}(t) = \qquad\qquad\qquad\qquad\qquad\qquad (13\text{-}3)$$
$$\left\{\frac{r_r a^2}{r_{w\_rear}^2}\cos(\theta_{set\_rear\_right})\right\}t^2 + \left\{\frac{2r_r a v_0}{r_{w\_rear}^2}\cos(\theta_{set\_rear\_right})\right\}t +$$
$$\frac{a r_r}{r_{w\_rear}}\sin(\theta_{set\_rear\_right}) + \frac{r_r v_0^2}{r_{w\_rear}^2}\cos(\theta_{set\_rear\_right})$$

$$A_{sens\_rear\_left}(t) = \qquad\qquad\qquad\qquad\qquad\qquad (13\text{-}4)$$
$$\left\{\frac{r_r a^2}{r_{w\_rear}^2}\cos(\theta_{set\_rear\_left})\right\}t^2 + \left\{\frac{2r_r a v_0}{r_{w\_rear}^2}\cos(\theta_{set\_rear\_left})\right\}t -$$
$$\frac{a r_r}{r_{w\_rear}}\sin(\theta_{set\_rear\_left}) + \frac{r_r v_0^2}{r_{w\_rear}^2}\cos(\theta_{set\_rear\_left})$$

Figures 5, 6:
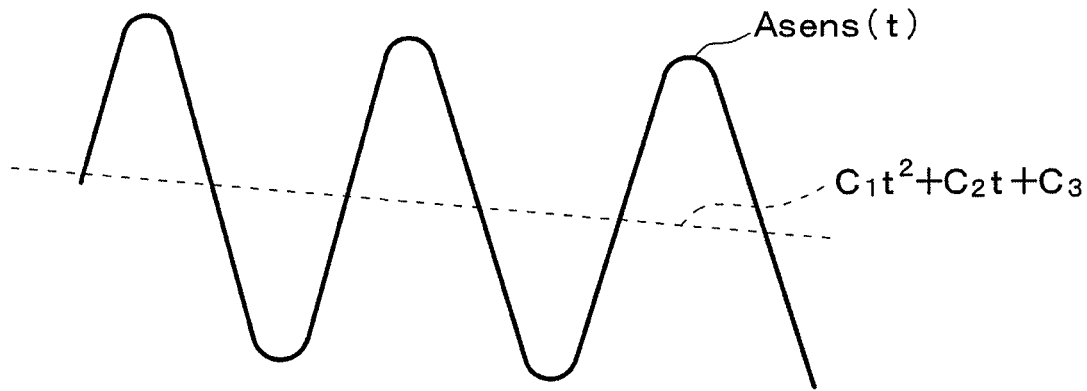
FIG. 5 is a diagram describing a relationship between median values of the amplitudes of acceleration $A_{sens}(t)$ that oscillates with the rotation of each wheel and approximation with a quadratic function.
FIG. 6 is a diagram illustrating conditions of a vehicle.

A periodic component associated with the rotation of each of the wheels 5a to 5d has been removed from the expressions 13-1 to 13-4. Thus, as illustrated in FIG. 5, each of these expressions expresses in a quadratic function a median value of the amplitude of the acceleration $A_{sens}(t)$, which oscillates with the rotation of each of the wheels 5a to 5d. The calculation quadratic functions that express the acceleration $A_{sens}(t)$, which is derived from calculation based on the basic expression, are provided in this manner.

Here, the acceleration of the wheels 5a to 5d differs from each other. In particular, a left wheel tends to have acceleration different from that of a right wheel. Thus, expressing a median value of the amplitude of acceleration $a_{real}$ that is actually detected by the G sensor 22 in a quadratic function provides the measurement quadratic function similar to the expressions 13. Accordingly, whether it is a left wheel or a right wheel is determined by comparing the calculation quadratic function to the measurement quadratic function expressed in the expressions 13.

Figure 7:
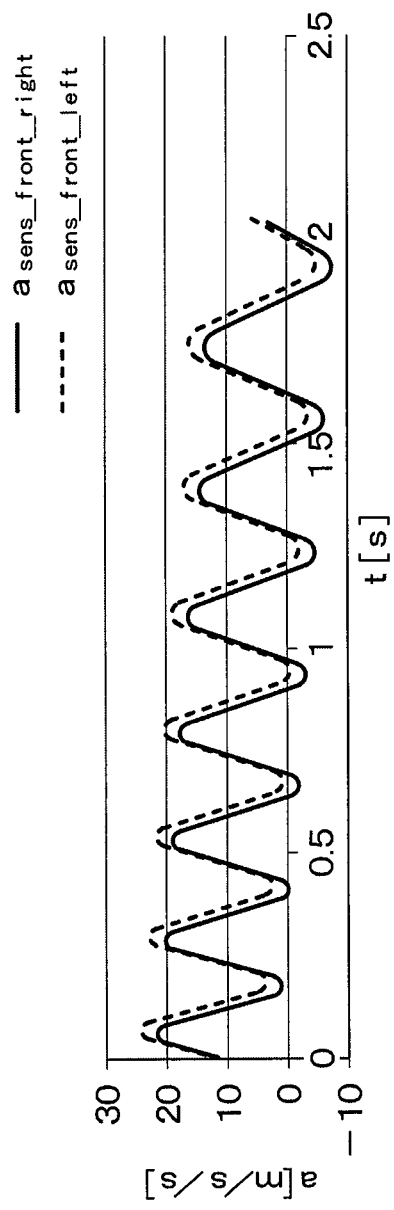
FIG. 7 is a diagram illustrating waveforms of measurement values $a_{sens}$ of the G sensors in the sensor transmitters attached on the right front wheel and the left front wheel.

For example, the measurement quadratic function is determined using a measurement value of the G sensor 22 in the case of the vehicle 1 that is put under the conditions listed in FIG. 6. At this point, it is unknown from just the measurement value of the G sensor 22 which one of the wheels 5a to 5d it is that the corresponding sensor transmitter 2 is attached to. Assuming the G sensors 22 included in the sensor transmitters 2 that are attached to the right and left front wheels 5a and 5b, the measurement values $a_{sens}$ have waveforms as illustrated in FIG. 7.

Figure 8A:
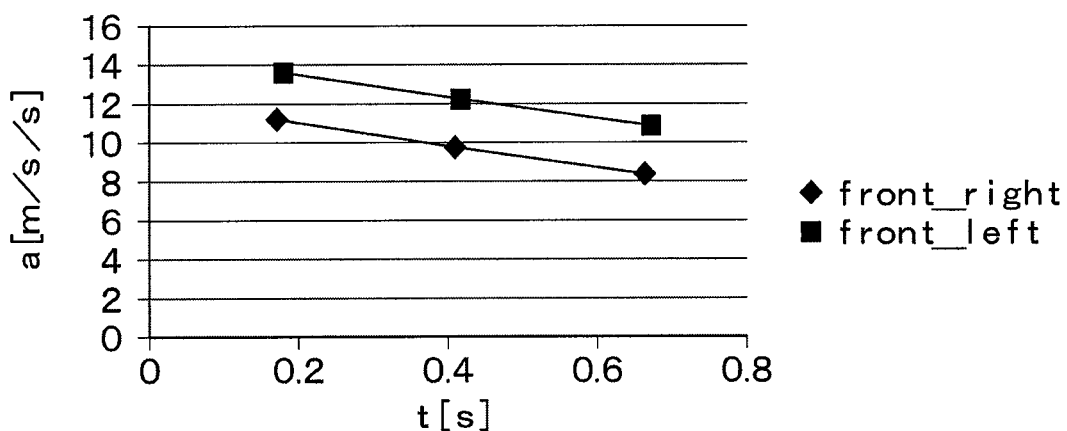
FIG. 8A is a diagram illustrating a graph plotting three points on the median values of the measurement value of each of the G sensors on the right front wheel and the left front wheel.

As illustrated in this figure, the G sensor 22 included in the sensor transmitter 2 that is attached to the right front wheel 5a has a measurement value different from that of the G sensor 22 included in the sensor transmitter 2 that is attached to the left front wheel 5b, although the G sensors 22 are both attached in the front wheels. Three points on the median values of the amplitudes of the measurement value of each of the G sensors 22 on the right and left front wheels 5a and 5b are taken in the range of 0 [s] to 0.8 [s]. They are plotted as illustrated in FIG. 8A. Approximation in a quadratic function that passes the three points leads to the expression 14-1 for the right front wheel 5a and the expression 14-2 for the left front wheel 5b. They are the measurement quadratic functions. As demonstrated above, the sensor transmitter 2 that is attached to the right front wheel 5a provides a measurement quadratic function different from that of the sensor transmitter 2 that is attached to the left front wheel 5b.

Figure 8B:
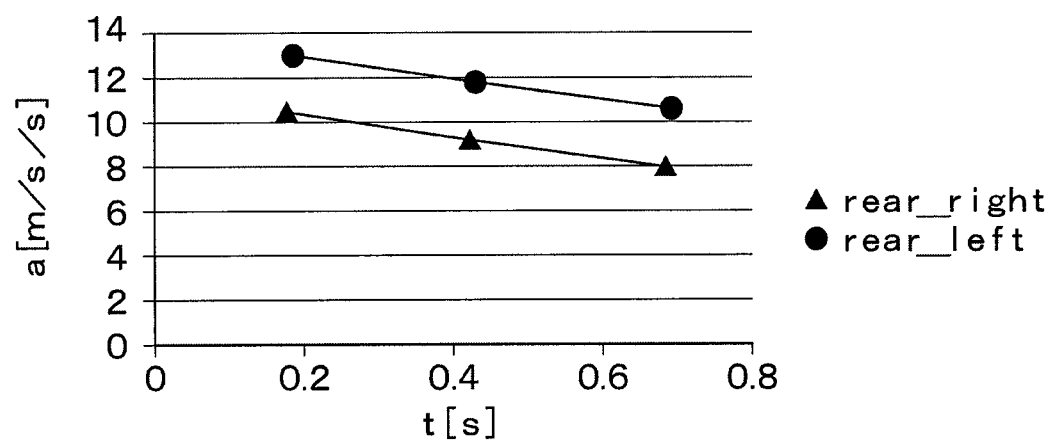
FIG. 8B is a diagram illustrating a graph plotting three points on the median values of the measurement value of each of the G sensors on the right rear wheel and the left rear wheel.

When performing a similar process for the G sensors 22 included in the sensor transmitters 2 attached to the right and left rear wheels 5c and 5d, plotting three points on the median values of the amplitudes of the measurement value of each of the G sensors 22 results in a graph as in FIG. 8B. Thus, the measurement quadratic functions expressed in the expressions 14-3 and 14-4 are obtained also for the sensor transmitters 2 that are attached to the right and left rear wheels 5c and 5d.

(Expression 14)

$$a_{real\_front\_right} = 0.7546t^2 - 6.3311t + 12.188 \qquad (14\text{-}1)$$

$$a_{real\_front\_left} = 0.7572t^2 - 6.3415t + 14.734 \qquad (14\text{-}2)$$

$$a_{real\_rear\_right} = 0.7548t^2 - 6.1819t + 11.843 \qquad (14\text{-}3)$$

$$a_{real\_rear\_left} = 0.7149t^2 - 6.1454t + 14.341 \qquad (14\text{-}4)$$

In the expressions 13-1 to 13-4, coefficients of the calculation quadratic function correspond to C1, C2, and C3. Specifically, the coefficient of $t^2$, which is a quadratic term, corresponds to C1, the coefficient of $t^1$, which is a linear term, corresponds to C2, and the coefficient of $t^0$, which is a zero degree term (i.e., a constant term) corresponds to C3. The coefficients C1, C2, and C3 are expressed in mathematical expressions as in expressions 15-1 to 15-3. The expressions 15-1 to 15-3 collectively express all the wheels 5a to 5d; adding subscripts corresponding to the wheels 5a to 5d achieve C1, C2, and C3 obtained from the calculation quadratic function derived from the measurement value $a_{sens}$ of the G sensor 22 of each of the wheels 5a to 5d.

(Expression 15)

$$C_1 = \frac{r_r a^2}{r_w^2} \cos(\theta_{set}) \quad (15\text{-}1)$$

$$C_2 = \frac{2 r_r a v_0}{r_{w\_front}^2} \cos(\theta_{set}) \quad (15\text{-}2)$$

$$C_3 = \pm \frac{a r_r}{r_w} \sin(\theta_{set}) + \frac{r_r v_0^2}{r_w^2} \cos(\theta_{set}) \quad (15\text{-}3)$$

Further converting the expression 15-1 to an expression of $a/r_w$ and converting the expression 15-2 to an expression of $v_0/r_w$ provides expressions 16-1 and 16-2.

(Expression 16)

$$\frac{a}{r_w} = \pm \sqrt{\frac{C_1}{r_r \cos(\theta_{set})}} \quad (16\text{-}1)$$

$$\frac{v_0}{r_w} = \pm \frac{C_2}{2} \sqrt{\frac{C_1}{C_1 r_r \cos(\theta_{set})}} \quad (16\text{-}2)$$

Here, while plus and minus signs are both provided for $a/r_w$ in the expression 16-1, and plus and minus signs are both provided for $v_0/r_w$ in the expression 16-2, the expression 16-2 has a plus sign because the vehicle speed $v_0$ is positive during forward traveling and the tire radius $r_w$ is also positive. Also in this case, the expression 16-1 has a plus sign because its sign is the same with that of the expression 16-2.

Then, C1 and C2 expressed by the measurement quadratic functions are substituted into the expressions 16-1 and 16-2, and the estimated tilt angle $\theta_{set}$ and the rim diameter $r_r$ stored in the microcomputer 23 of each sensor transmitter 2 are also substituted into the expressions 16-1 and 16-2. In this manner, the values for $a/r_w$ and $v_0/r_w$ in the expressions 16-1 and 16-2 are obtained. By substituting the obtained values for $a/r_w$ and $v_0/r_w$ in the expression 15-3, C3 can be obtained.

At this point in time, whether the first term of the expression 15-3 has a plus sign or a minus sign is unknown. Therefore, the expression 15-3 is solved using a plus sign and a minus sign to obtain two values for C3. The two values are then compared to the measurement value of C3 in the measurement quadratic function. One of the two values that is closer to the measurement value indicates the correct sign. Then, if the first term of the expression of C3 indicated in the expression 15-3 has a plus sign, the right wheels 5a and 5c are determined. If it has a minus sign, the left wheels 5b and 5d are determined. That is, as indicated in the coefficients of $t^0$, which express C3, in the expressions 13-1 to 13-4, the first terms of the coefficient portions have plus signs for the right wheels 5a and 5c, and the first terms of the coefficient portions have minus signs for the left wheels 5b and 5d.

Thus, whether each sensor transmitter 2 is attached to one of the right wheels 5a and 5c or the left wheels 5b and 5d can be estimated on the basis of whether the first term of the expression of C3 in the expression 15-3 has a plus sign or a minus sign.

When the estimation whether each sensor transmitter 2 is attached to one of the right wheels or the left wheels has been performed in this manner, a frame including data such as the result of the estimation and a value obtained during the estimation is transmitted by each sensor transmitter 2 and received by the receiver 3. The receiver 3 determines whether each sensor transmitter 2 that has transmitted the frame is attached to one of the right wheels or the left wheels on the basis of the result of the estimation stored in the frame. The receiver 3 further determines whether each sensor transmitter 2 is attached to the front wheel or the rear wheel on the basis of a value obtained during the estimation and stored in the frame.

A frame stores, for example, $a/r_w$, which is related to the effective tire radius and obtained during the estimation. It is determined whether each sensor transmitter 2 is attached to the front wheel or the rear wheel on the basis of the value of $a/r_w$, which is related to the effective tire radius.

Figure 9:
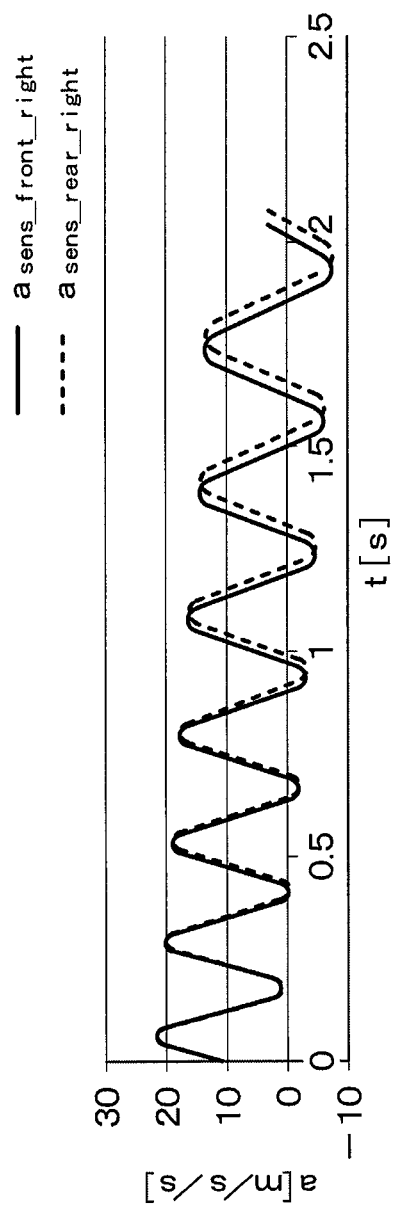
FIG. 9 is a diagram illustrating waveforms of measurement values $a_{sens}$ of the G sensors in the sensor transmitters attached on the right front wheel and the right rear wheel.

Specifically, the G sensor 22 included in the sensor transmitter 2 that is attached to a front wheel has a measurement value different from that of the G sensor 22 included in the sensor transmitter 2 that is attached to a rear wheel. Assuming the G sensors 22 included in the sensor transmitters 2 that are attached to the front and rear wheels 5a and 5c on the right hand side, the measurement values have waveforms as illustrated in FIG. 9. As illustrated in this figure, while the sensor transmitters 2 that are attached to the front and rear wheels 5a and 5c on the right hand side have a slight difference in amplitude because they are located on the same side of the vehicle 1, they have a phase difference corresponding to a difference in effective tire radius. In general, a front wheel has an effective tire radius smaller than that of a rear wheel. Thus, a phase of the amplitude of the G sensor 22 on the front wheel is earlier than that on the rear wheel.

If the vehicle 1 is equipped with the front wheels 5a and 5b having a tire radius different from that of the rear wheels 5c and 5d, the waveforms of their measurement values have a phase difference based on the different effective tire radiuses. Whether each sensor transmitter 2 is attached to a front wheel or a rear wheel can be determined on the basis of the phase difference. Additionally, even if the front wheels 5a and 5b have a stationary tire radius not different from that of the rear wheels 5c and 5d, the front wheels 5a and 5b have an effective tire radius different from that of the rear wheels 5c and 5d due to the load movement during acceleration/deceleration of the vehicle 1. Thus, whether each sensor transmitter 2 is attached to a front wheel or a rear wheel can be determined on the basis of a difference in effective tire radius.

The receiver 3 compares the values of $a/r_w$, which is related to the effective tire radius, from the sensor transmitters 2 that have the data including the results of the estimation indicating that these sensor transmitters 2 are attached to the right wheels 5a and 5c and determines which value is larger. The receiver 3 then determines that the sensor transmitter 2 that has transmitted the data including the smaller value is attached to the right front wheel 5a and that the sensor transmitter 2 that has transmitted the data including the larger value is attached to the right rear wheel 5c. Similarly, the receiver 3 compares the values of $a/r_w$, which is related to the effective tire radius, from the sensor transmitters 2 that have the data including the results of the estimation indicating that these sensor transmitters 2 are attached to the left wheels 5b and 5d and determines which value is larger. The receiver 3 then determines that the sensor transmitter 2 that has transmitted the data including the smaller value is attached to the left front wheel 5b and that the sensor transmitter 2 that has transmitted the data including the larger value is attached to the left rear wheel 5d.

As described above, each sensor transmitter 2 calculates the tilt angle $\theta_{set}$ and determines whether each sensor transmitter 2 itself is attached to one of the right wheels 5a and 5c or the left wheels 5b and 5d on the basis of the calculation quadratic function and the measurement quadratic function. Then, the receiver 3 determines whether each sensor transmitter 2 is attached to one of the front wheels 5a and 5b or the rear wheels 5c and 5d on the basis of the result of the estimation and the effective tire radiuses. In this manner, which one of the wheels 5a to 5d each sensor transmitter 2 is attached to can be determined.

Instead of determining the front wheel or the rear wheel by using the value of $a/r_w$, which is related to the effective tire radius, on the vehicle side as described above, each sensor transmitter 2 can determine itself whether it is attached to a front wheel or a rear wheel by storing $a/r_w$ obtained during acceleration and during deceleration and comparing their absolute values. Specifically, it can be determined that each sensor transmitter 2 is attached to a front wheel, if the absolute value of $a/r_w$ obtained while a>0, i.e., during acceleration, is smaller than the absolute value of $a/r_w$ obtained while a<0, i.e., during deceleration. It can be determined whether the vehicle is accelerating or decelerating on the basis of the sign of $a/r_w$ or the like.

Such a wheel position detection method requires no additional device such as a trigger machine and thus can prevent an increase in complexity of the device configuration and an increase in cost. Additionally, the mounting position of the receiver 3 or the receiving antenna 31 is subject to reduced constraint. Additionally, a special sensor, namely a two-axis G sensor, is not required. Furthermore, a steerable wheel and a driven wheel can be discriminated. Moreover, since information from a wheel speed sensor applied to the ABS control is not used, no increase in complexity of the communication specifications is caused. Also, accurate wheel position detection can be performed without requiring accuracy with which the tire air pressure is detected.

Other Embodiments

While the receiving antenna 31 includes one antenna for common use in the foregoing embodiment, multiple antennas may be provided; for example, four antennas corresponding to the wheels 5a to 5d may be provided. In the case when the receiving antenna 31 includes the one common antenna, it may be difficult to identify the wheels 5a to 5d that the sensor transmitter 2 is attached to, and the common antenna is effective particularly.

Additionally, in the foregoing embodiment, the data indicative of the result of the wheel position detection is stored in a frame that stores information on the tire air pressure to be transmitted since the wheel position detection apparatus is used in the tire pressure monitoring system. This frame configuration is provided as a mere example; a frame to store the data indicative of the result of the wheel position detection and another frame to store the information on the tire air pressure may be provided. Note that storing the data indicative of the result of the wheel position detection in the frame that stores the information on the tire air pressure achieves a common frame that enables both the wheel position detection and the tire air pressure detection.

Additionally, in the foregoing embodiment, a case has been described in which a value of $a/r_w$, which is related to the effective tire radius, is used as an example method of determining whether each sensor transmitter 2 is attached to one of the front wheels 5a and 5b or the rear wheels 5c and 5d. However, a method other than that described in the foregoing embodiment may be used. For example, it may be determined whether each sensor transmitter 2 is attached to the front wheel or the rear wheel by storing a result of detection of acceleration by each of the G sensors 22 in a frame and comparing phases of waveforms of the acceleration provided by the G sensors 22 in the sensor transmitters 2 attached to the right wheels 5a and 5c or the left wheels 5b and 5d. Additionally, while $a/r_w$ is stored in a frame as a value related to the effective tire radius, the effective tire radius itself may be stored in the frame as a value related to the effective tire radius.

While various embodiments, configurations, and aspects of a sensor transmitter, a wheel position detection apparatus, and a tire pressure monitoring system provided with the same have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. A wheel position detection apparatus that is applied to a vehicle including a vehicle body and four wheels attached to the vehicle body, each of the four wheels being equipped with a tire, the wheel position detection apparatus comprising:
　　a sensor transmitter that is attached to each of the four wheels, the sensor transmitter including
　　　an acceleration sensor that detects acceleration in a detecting direction that is shifted circumferentially by a predetermined angle with respect to a radial direction of a corresponding one of the four wheels, and
　　　a first control portion that performs wheel position detection based on the acceleration detected by the acceleration sensor and generates and transmits a frame storing data indicative of a result of the wheel position detection; and
　　a receiver that is provided in the vehicle body, the receiver including
　　　a receiving portion that receives the frame transmitted by each of the sensor transmitters via a receiving antenna, and
　　　a second control portion that determines whether each of the sensor transmitters that has transmitted the frame is attached to one of right wheels or left wheels of the four wheels on a basis of the data indicative of the result of the wheel position detection obtained from the frame received,
　　wherein:
　　the acceleration sensor has a single acceleration detecting direction;
　　the first control portion calculates a tilt angle based on the acceleration detected by the acceleration sensor;
　　the tilt angle corresponds to the predetermined angle by which the acceleration sensor is shifted circumferentially with respect to the radial direction, and the tilt angle is the predetermined angle between the single acceleration detecting direction and the radial direction;

the first control portion estimates based on the tilt angle whether the sensor transmitter including the first control portion is attached to one of the right wheels or the left wheels;

the first control portion determines a calculation quadratic function that approximates in a quadratic function a median value of an amplitude of a calculation value of acceleration in a case where the acceleration sensor is attached to a corresponding one of the wheels at the tilt angle and a measurement quadratic function that approximates in a quadratic function a median value of an amplitude of a value actually detected by the acceleration sensor;

the first control portion performs a comparison of the calculation quadratic function with the measurement quadratic function;

the first control portion estimates whether the sensor transmitter including the first control portion is attached to one of the right wheels or the left wheels based on the comparison;

the first control portion calculates a value related to an effective tire radius from a coefficient of a quadratic term of the calculation quadratic function and a coefficient of a quadratic term of the measurement quadratic function, stores data of the value related to the effective tire radius in the frame, and transmits the frame;

the second control portion compares the effective tire radiuses based on the data of the values related to the effective tire radiuses stored in the frames transmitted from the sensor transmitters that have been determined to be attached to the right wheels and determines that one of the sensor transmitters that has transmitted the data including a smaller effective tire radius is attached to a right front wheel and that another one of the sensor transmitters that has transmitted the data including a larger effective tire radius is attached to a right rear wheel; and the second control portion further compares the effective tire radiuses transmitted from the sensor transmitters that have been determined to be attached to the left wheels and determines that one of the sensor transmitters that has transmitted the data including a smaller effective tire radius is attached to a left front wheel and that another one of the sensor transmitters that has transmitted the data including a larger effective tire radius is attached to a left rear wheel.

2. The wheel position detection apparatus according to claim 1, wherein:
the first control portion calculates the tilt angle when the first control portion detects that a vehicle speed is constant based on the acceleration detected by the acceleration sensor.

3. The wheel position detection apparatus according to claim 1, wherein:
the first control portion estimates whether the sensor transmitter including the first control portion is attached to one of the right wheels or the left wheels when the first control portion detects deceleration from the acceleration detected by the acceleration sensor.

4. The wheel position detection apparatus according to claim 1, wherein:
with $C_1$ being a coefficient of a quadratic term of the measurement quadratic function, $C_2$ being a coefficient of a linear term of the measurement quadratic function, $C_3$ being a constant term of the measurement quadratic function, $a$ being acceleration of the vehicle, $v_0$ being an initial speed of vehicle speed, $r_r$ being a rim diameter of each of the four wheels, $r_w$ being an effective tire radius, and $\theta_{set}$ being the tilt angle, the first control portion substitutes a measurement value of $C_1$ into an expression 1 to calculate $a/r_w$, where (Expression 1)

$$\frac{a}{r_w} = \pm \sqrt{\frac{C_1}{r_r \cos(\theta_{set})}},$$

substitutes measurement values of $C_1$ and $C_2$ into an expression 2 to calculate $v_0/r_w$, where (Expression 2)

$$\frac{v_0}{r_w} = \pm \frac{C_2}{2} \sqrt{\frac{C_1}{C_1 \; r_r \cos(\theta_{set})}},$$

substitutes $a/r_w$ and $v_0/r_w$ into an expression 3, obtains $C_3$ in both cases where a first term of the expression 3 has a plus sign and a minus sign, selects, as a correct sign, one of the plus sign and the minus sign that produces a value that is closer to a value of $C_3$ that is a constant term of the measurement quadratic function, and estimates that the sensor transmitter including the first control portion is attached to one of the right wheels when the correct sign is the plus sign and that the sensor transmitter including the first control portion is attached to one of the left wheels when the correct sign is the minus sign, where (Expression 3)

$$C_3 = \pm \frac{a r_r}{r_w} \sin(\theta_{set}) + \frac{r_r v_0^2}{r_w^2} \cos(\theta_{set}).$$

5. A sensor transmitter in the wheel position detection apparatus according to claim 1.

6. A tire pressure monitoring system comprising the wheel position detection apparatus according to claim 1, wherein:
the sensor transmitter further comprises a sensing portion that outputs a detection signal corresponding to an air pressure of the tire attached to a corresponding one of the four wheels, stores, in a frame, information on tire air pressure resulting from signal processing performed by the first control portion on the detection signal from the sensing portion, and transmits the frame to the receiver; and the second control portion in the receiver detects an air pressure of the tire attached to each of the four wheels from the information on the tire air pressure.

7. A wheel position detection apparatus that is applied to a vehicle including a vehicle body and four wheels attached to the vehicle body, each of the four wheels being equipped with a tire, the wheel position detection apparatus comprising:
- a sensor transmitter that is attached to each of the four wheels, the sensor transmitter including
  - an acceleration sensor that detects acceleration in a detecting direction that is shifted circumferentially by a predetermined angle with respect to a radial direction of a corresponding one of the four wheels, and
  - a first control portion that performs wheel position detection based on the acceleration detected by the acceleration sensor and generates and transmits a frame storing data indicative of a result of the wheel position detection; and
- a receiver that is provided in the vehicle body, the receiver including
  - a receiving portion that receives the frame transmitted by each of the sensor transmitters via a receiving antenna, and
  - a second control portion that determines whether each of the sensor transmitters that has transmitted the frame is attached to one of right wheels or left wheels of the four wheels on a basis of the data indicative of the result of the wheel position detection obtained from the frame received, wherein:
the acceleration sensor has a single acceleration detecting direction;
the first control portion calculates a tilt angle based on the acceleration detected by the acceleration sensor;
the tilt angle corresponds to the predetermined angle by which the acceleration sensor is shifted circumferentially with respect to the radial direction, and the tilt angle is the predetermined angle between the single acceleration detecting direction and the radial direction;
the first control portion estimates based on the tilt angle whether the sensor transmitter including the first control portion is attached to one of the right wheels or the left wheels; and
the first control portion determines a first value related to an effective tire radius obtained during acceleration by dividing the acceleration detected by the acceleration sensor during the acceleration with the effective tire radius to obtain the first value, determines a second value related to the effective tire radius obtained during deceleration by dividing the acceleration detected by the acceleration sensor during the deceleration with the effective tire radius to obtain the second value, compares absolute values of the first and second values, and determines that the sensor transmitter including the first control portion is attached to one of front wheels when the first value that is obtained during the acceleration is smaller than the second value that is obtained during the deceleration and that the sensor transmitter including the first control portion is attached to one of rear wheels when the first value that is obtained during the acceleration is larger than the second value that is obtained during the deceleration.

* * * * *